United States Patent
Collins et al.

(10) Patent No.: US 8,281,937 B2
(45) Date of Patent: Oct. 9, 2012

(54) COMPACT FLUID PURIFICATION DEVICE WITH MANUAL PUMPING MECHANISM

(75) Inventors: Gregory R. Collins, Monroe, NY (US); James Summerton, Hillsdale, NJ (US)

(73) Assignee: Nephros, Inc., New York, NY (US)

( * ) Notice: Subject to any disclaimer, the term of this patent is extended or adjusted under 35 U.S.C. 154(b) by 1072 days.

(21) Appl. No.: 12/031,428

(22) Filed: Feb. 14, 2008

(65) Prior Publication Data
US 2008/0197062 A1     Aug. 21, 2008

Related U.S. Application Data

(60) Provisional application No. 60/890,251, filed on Feb. 16, 2007.

(51) Int. Cl.
*B01D 33/01*     (2006.01)
*B01D 63/00*     (2006.01)
*B01D 63/02*     (2006.01)

(52) U.S. Cl. .................. 210/416.3; 210/257.2; 210/258; 210/321.6; 210/321.67; 210/321.8; 210/321.89; 210/416.1

(58) Field of Classification Search ............... 210/416.3, 210/321.67, 321.8, 321.89, 258, 257.2, 321.6, 210/416.1; 417/560
See application file for complete search history.

(56) References Cited

U.S. PATENT DOCUMENTS

| | | |
|---|---|---|
| 2,286,302 A | 6/1942 | Parsons |
| 2,404,967 A | 7/1946 | Levy |
| 4,070,280 A | 1/1978 | Bray |
| 5,019,252 A | 5/1991 | Kamei et al. |
| 5,534,145 A | 7/1996 | Platter et al. |

(Continued)

FOREIGN PATENT DOCUMENTS

EP     0338844     10/1989

(Continued)

OTHER PUBLICATIONS

Instruction Manual of a filter/pump device (from Mountain Safety Reserach (MRS)).

*Primary Examiner* — Nam Nguyen
*Assistant Examiner* — Paul J Durand
(74) *Attorney, Agent, or Firm* — Leason Ellis LLP

(57) ABSTRACT

According to one exemplary embodiment, a compact fluid purification device includes a housing having an inlet for receiving unfiltered liquid and an open end and a first valve disposed within the inlet and being configured to only permit unfiltered liquid to flow into a hollow interior of the housing. The device has a plunger received within the open end such that it slides within the interior of the housing. The plunger is movable between a fully extended position and a fully retracted position, wherein the plunger has an elongated housing that includes a filter element, such as, a plurality of hollow filter elements that are open at a distal end of the plunger housing and are in communication with an outlet that is associated with the plunger. Movement of the plunger toward the fully extended position causes unfiltered liquid to be drawn into the interior of the housing and the device includes a second valve disposed within the outlet and being configured to only permit filtered liquid to be discharged from the plunger housing. The unfiltered liquid is filtered when the plunger is moved toward the fully retracted position causing the unfiltered liquid in the interior to flow into the inside of the filter elements and then across the filter elements and into the outlet.

19 Claims, 13 Drawing Sheets

U.S. PATENT DOCUMENTS

| | | | |
|---|---|---|---|
| 5,846,417 A | 12/1998 | Jiang et al. | |
| 5,951,825 A | 9/1999 | Land | |
| 6,010,626 A * | 1/2000 | D'Agostino | 210/238 |
| 6,068,761 A | 5/2000 | Yuen et al. | |
| 6,495,041 B2 * | 12/2002 | Taniguchi et al. | 210/321.89 |
| 6,634,869 B2 * | 10/2003 | Britz | 417/313 |
| 7,534,349 B2 * | 5/2009 | Collins et al. | 210/258 |
| 2003/0164333 A1 * | 9/2003 | Nohren et al. | 210/650 |
| 2006/0000761 A1 | 1/2006 | Choi et al. | |

FOREIGN PATENT DOCUMENTS

| | | |
|---|---|---|
| JP | 6226055 | 8/1994 |
| WO | WO 98/50090 | 11/1998 |
| WO | WO 2006/074519 | 7/2006 |

* cited by examiner

COMPACT FLUID PURIFICATION DEVICE WITH MANUAL PUMPING MECHANISM

CROSS REFERENCE TO RELATED APPLICATION

The present application claims priority to U.S. patent application Ser. No. 60/890,251, filed Feb. 16, 2007, which is hereby incorporated by reference in its entirety.

TECHNICAL FIELD

The present invention relates generally to filtration devices, and more particularly, to a compact fluid purification device in which the filtering means is integrated as part of the pump mechanism.

BACKGROUND

When traveling on foot in remote locations such as during hiking, camping, military operations, or other, the size and weight of the equipment one is carrying is a very important issue. Devices used to purify water in these remote locations (where no electricity may be available) primarily fall into three categories: chemical disinfection (e.g., chlorine, iodine), adsorption (e.g., activated carbon, adsorptive resins), and filtration (e.g., membrane filters, ceramic or carbon filter blocks). A drawback of filtration devices used for this purpose is their relatively large size. The larger size is generally due to the fact that a pump mechanism is somehow attached to the filter so that one can generate sufficient pressure to force water across the filter as part of the purification process. A typical arrangement is one whereby a volume displacement type pump is in series with a filter device. The volume displacement pump is generally a piston type pump which includes a stationary barrel component and a moveable plunger component. Examples of these include First Need Delux, from General Ecology, Inc (Exton, Pa.), and Sweet-Water Purifier, from Mountain Safety Research, Inc. (Seattle, Wash.) Though the filter and pump mechanism can be semi-rigidly attached to one another, a problem with these designs is their large size is basically caused by having the filter and pump as two discrete elements. For example, the overall size (i.e. the volume the whole device occupies) is the sum of each component (i.e. it's the pump volume plus the filter volume). Upon examining the pump volume, one must use the whole barrel volume, regardless if the if the plunger component is fully inserted inside the barrel. This is because the area behind the plunger still takes up what would be considered storage space.

Thus, there is a perceived need for a compact fluid purification device with a manual pumping mechanism and which overcomes the above deficiencies.

SUMMARY

The objective of this patent is to overcome this problem by integrating the filter as part of the pump mechanism so as to make the filter device small and compact in size.

According to one exemplary embodiment, a compact fluid purification device includes a housing having an inlet for receiving unfiltered liquid and an open end and a first valve disposed within the inlet and being configured to only permit unfiltered liquid to flow into a hollow interior of the housing. The device has a plunger received within the open end such that it slides within the interior of the housing. The plunger is movable between a fully extended position and a fully retracted position, wherein the plunger has an elongated housing that includes a plurality of hollow fiber filter elements that are open at a distal end of the plunger housing and are in communication with an outlet that is associated with the plunger. Movement of the plunger toward the fully extended position causes unfiltered liquid to be drawn into the interior of the housing and the device includes a second valve disposed within the outlet and being configured to only permit filtered liquid to be discharged from the plunger housing. The unfiltered liquid is filtered when the plunger is moved toward the fully retracted position causing the unfiltered liquid in the interior to flow into the inside of the filter elements and then across the filter elements and into the outlet.

According to another embodiment, a compact fluid purification device that has redundant filtration includes a housing having a first compartment and a second compartment. The first compartment has an inlet at a first end for receiving unfiltered liquid and the second compartment has an outlet at a first end for discharging filtered liquid, with each of the first and second compartments having an open end. The device includes a first valve disposed within the inlet and being configured to only permit unfiltered liquid to flow into the first compartment and a second valve disposed within the outlet and being configured to only permit filtered liquid to be discharged from the second compartment. The device includes a plunger received within the open ends of the first and second compartments such that it slides within the first and second compartments. The plunger is movable between a fully extended position and a fully retracted position, wherein the plunger has a first elongated housing that includes a first set of hollow fiber filter elements and a second elongated housing that includes a second set of hollow fiber filter elements. Each of the first and second set of filter elements is open at distal ends thereof. The first set of hollow filter elements are in fluid communication with the inlet and the second set of hollow filter elements are in fluid communication with the outlet; and a connector conduit is provided that fluidly connects the first compartment to the second compartment.

Movement of the plunger toward the fully extended position causes unfiltered liquid to be drawn into the first compartment and wherein the unfiltered liquid is filtered when the plunger is moved toward the fully retracted position causing the unfiltered liquid in the interior to flow into the inside of the first set of filter elements and then across the first set of filter elements to produce once filtered liquid that flows through the connecting conduit filter to the second elongated housing where it is filtered across the second set of the filter elements and is then discharged through the outlet.

In another embodiment, a compact fluid purification device includes a housing having an inlet for receiving unfiltered liquid and an open end and a first valve disposed within the inlet and being configured to only permit unfiltered liquid to flow into a hollow interior of the housing. A plunger is received within the open end such that it slides within the interior of the housing. The plunger is movable between a fully extended position and a fully retracted position, wherein the plunger has a first housing that includes a first set of hollow fiber filter elements that are open at a distal end of the plunger housing and are sealed at an opposite end. The plunger housing has a through hole proximate the sealed ends of the first set of hollow fiber filter elements for discharging once filtered liquid after it has been filtered across the first set of hollow fiber filter elements. The plunger includes a second housing that has an open end that is sealingly attached to the first plunger housing such that the through hole in the first plunger housing is in fluid communication with an interior of the second plunger housing. The second plunger housing has a second set of hollow filter elements disposed therein and having open ends that are in fluid communication with an outlet through which twice filtered liquid is discharged after being filtered across the second set of filter elements. A second valve is disposed within the outlet and being configured to only permit twice filtered liquid to be discharged through the outlet.

BRIEF DESCRIPTION OF THE DRAWING FIGURES

DETAILED DESCRIPTION OF PREFERRED EMBODIMENTS

A compact (size-efficient) filter device with integral manual hand pump mechanism for purification of water or other fluids is provided in accordance with several embodiments of the present invention.

Figure 1:
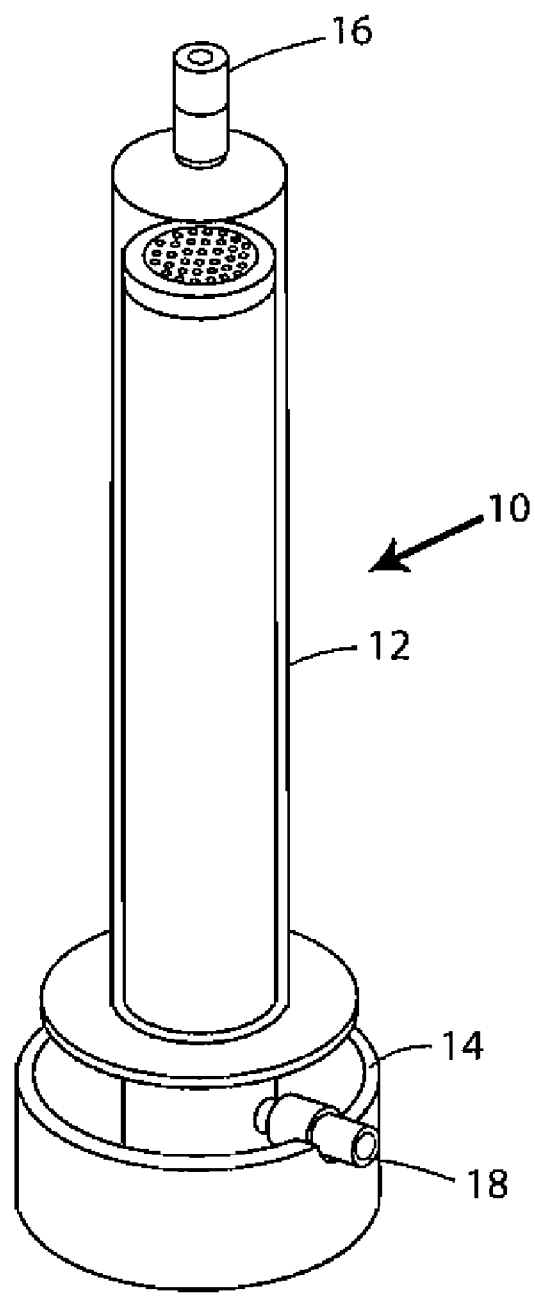
FIG. 1 is a perspective view of a compact fluid purification device with a manual pumping mechanism according to one exemplary embodiment.

A first embodiment is shown in FIG. 1 which provides a perspective view of a compact filter/pump device 10 that resembles a syringe and/or a syringe type pump composed of a barrel 12 and a plunger 14. The inlet 16 of the filter/pump device is positioned at the distal end of the barrel 12 and the outlet 18 of the filter/pump device is positioned near the end of the plunger 14. Further description of the first embodiment is illustrated in cross-sectional views shown in FIGS. 2, 3, 4, and 5.

It will be appreciated that the filter/pump devices disclosed herein are suitable for use with a number of different liquids for the purification of these liquids. One exemplary liquid is water and accordingly, the devices disclosed herein are suited for purifying unfiltered water; however, it will be appreciated that the present invention is not limited to being used with water.

Figure 2:
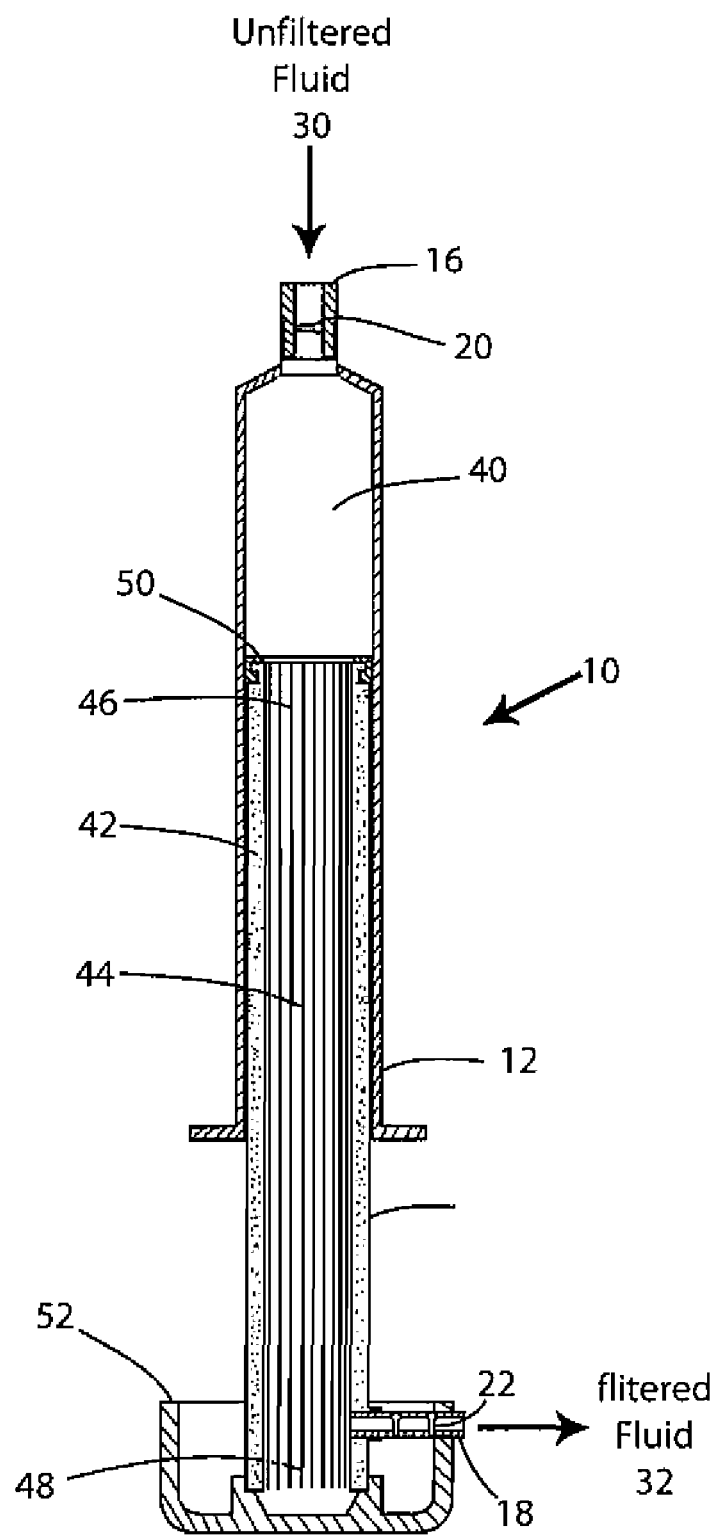
FIG. 2 is a cross-sectional view of the device of FIG. 1.

FIG. 2 shows the filter/pump device with the plunger component 14 partially withdrawn from the barrel 12. At the inlet 16 of the filter/pump device, a one-way check valve 20 is used to allow a source of unfiltered fluid 30 to enter the internal barrel compartment 40 when the plunger 14 is being withdrawn from the barrel 12 and to prevent unfiltered fluid filling barrel compartment 40 from leaking back out the inlet 16 when the plunger 14 is being pushed into the barrel 12. In addition, a second one-way check-valve 22 is positioned at outlet 18 of the device such that filtered fluid 32 does not leak back into the barrel compartment 40 when the plunger 14 is being withdrawn from the barrel 12 and to allow filtered fluid 32 to exit the filter/pump device when the plunger 14 is being pushed into the barrel. The one-way check valves 20 and 22 can be a spring loaded ball/seat type as shown, or may another type such as a duck-bill, flexible disk, etc. as is known in the art.

The plunger 14 is in itself a filter device that is constructed with a plunger housing 42 that encases a filter element (or elements) 44 inside said plunger housing. As shown, the filter element may consist of a bundle of semi-permeable hollow fibers that are longitudinally placed along the axis of said plunger housing. The hollow fibers may be potted at each end 46 and 48 of the plunger housing 42 with a polyurethane, epoxy, or other such material as is known in the art. At a first end of the plunger housing, a plunger seal 50 may be attached. The plunger seal 50 creates a fluid type seal between the plunger 14 and the barrel 12 thereby preventing fluid from leaking in-between the plunger and barrel during operation of the filter/pump device.

Figure 3:
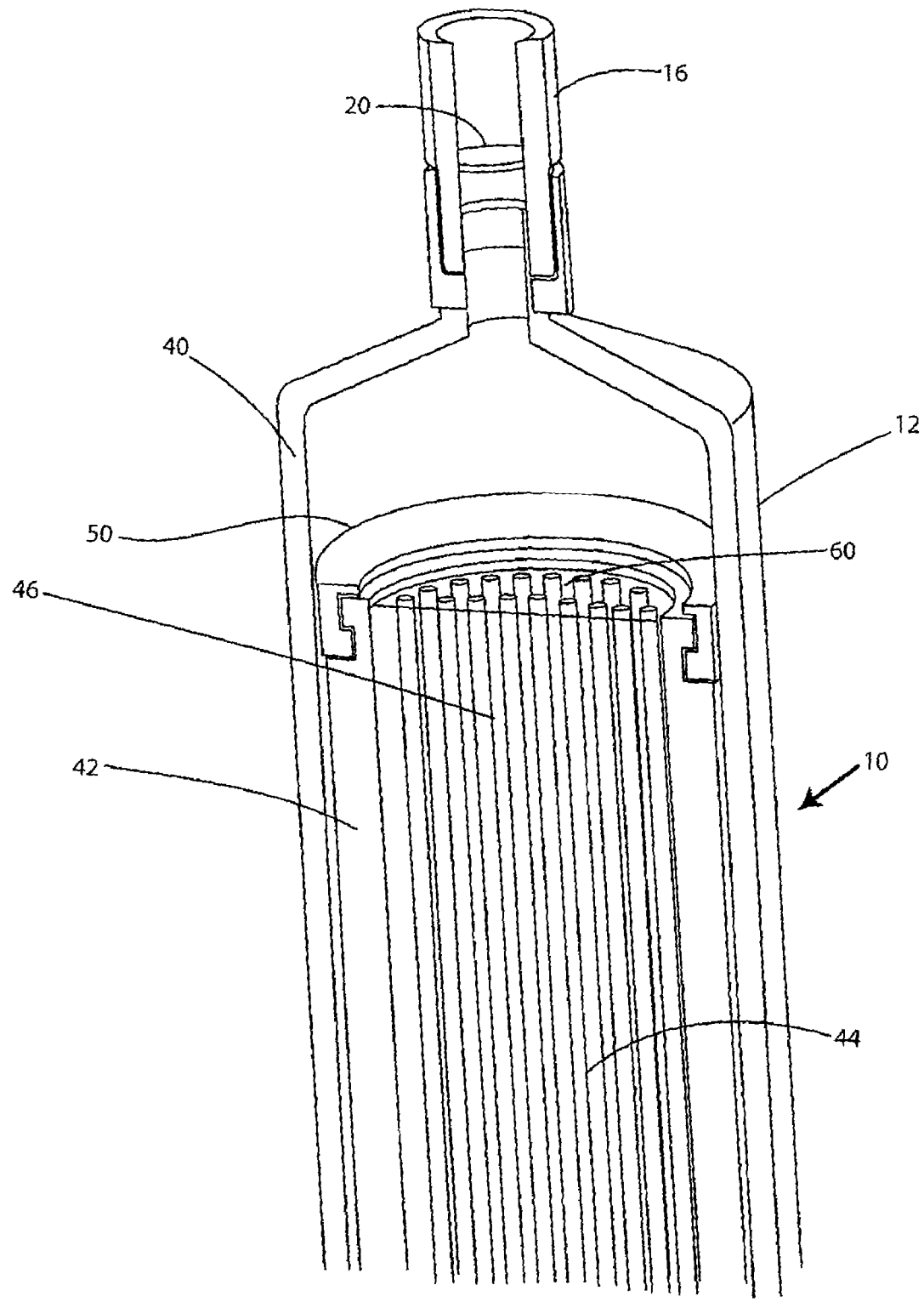
FIG. 3 is a close-up, localized cross-sectional view of an inlet end of the device of FIG. 1.

Reference is now made to FIG. 3 which shows a close-up cross-sectional view of said first end of the plunger housing 42. At this end, the potted hollow fibers 46 have been opened, such as by a cutting or trimming operation, to form a tubesheet surface 60. This allows unfiltered fluid contained in the barrel compartment 40 to flow into the lumen space of the hollow fibers when the plunger 14 is being pushed into the barrel 12. The plunger seal 50 is configured with an opening such that it does not interfere with flow of fluid into the hollow fibers at the tubesheet 60.

Figure 4:
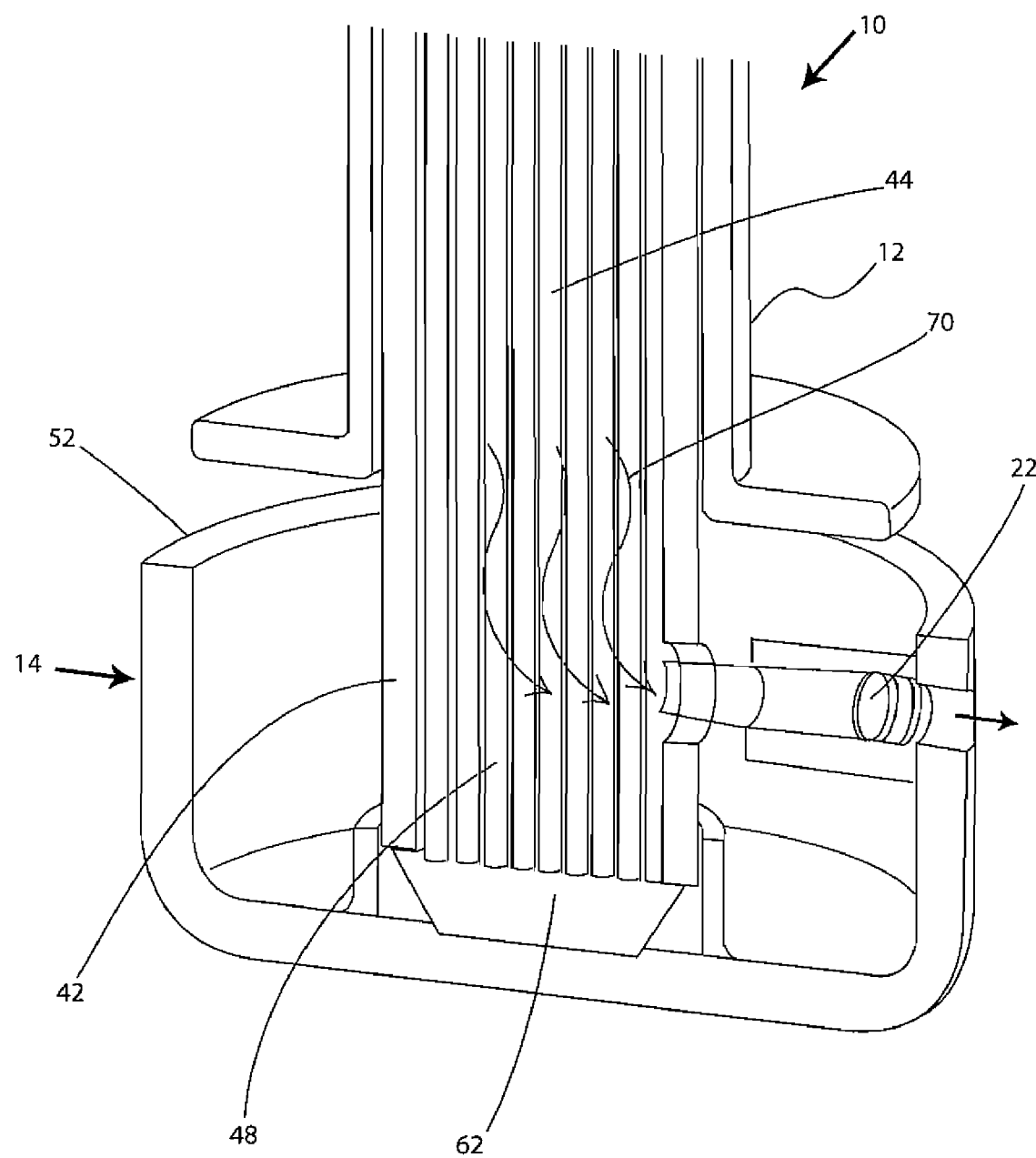
FIG. 4 is a close-up, localized cross-sectional view of an outlet end of the device of FIG. 1.

Reference is now made to FIG. 4 which shows a close-up cross-sectional view of said second end of the plunger housing 42. At this end, the potted hollow fibers 48 have not been opened by a secondary trimming operation. Here, the potting material forms a plug 62 that essentially seals the inside and outside of each of the hollow fibers and seals the end of the plunger housing 42. As such, upon pushing the plunger 14 into the barrel 12, fluid is forced across the semi-permeable hollow fiber membrane 44 since it cannot escape through the plugged ends 62. The filtered fluid 70 is directed out of the plunger through the outlet check-valve 22. A plunger cap 52 may be attached to said second end of plunger housing 42 as an aid to better grip and operate the filter/pump device.

It should be understood to those skilled in the art that operation of the filter/pump device is composed as two discrete pump phases as follows:

Fluid Suction Phase: The action of pulling the plunger 14 out of the barrel 12 creates a negative pressure inside the barrel compartment 40 that draws unfiltered fluid 30 into the inlet 16 of the device, through the inlet check-valve 20 and into the expanding barrel compartment 40. The outlet check valve 22 further prevents fluid leaking back into the filter/pump device during this phase of the pump operation.

Fluid Expelling Phase: The action of pushing the plunger 14 into the barrel 12 creates a positive pressure in the contracting barrel compartment 40 that forces unfiltered fluid within compartment 40 across the filter elements 44 thereby removing fluid impurities such as bacteria, other microorganisms, and the like. The filtered fluid (or permeate) 70 collects downstream filter element and passes through the outlet check-valve 22 and out through the device outlet 18. The inlet check valve 20 further prevents unfiltered fluid from leaking back out of the inlet 16 of the device during this phase of the pump operation.

Figure 5:
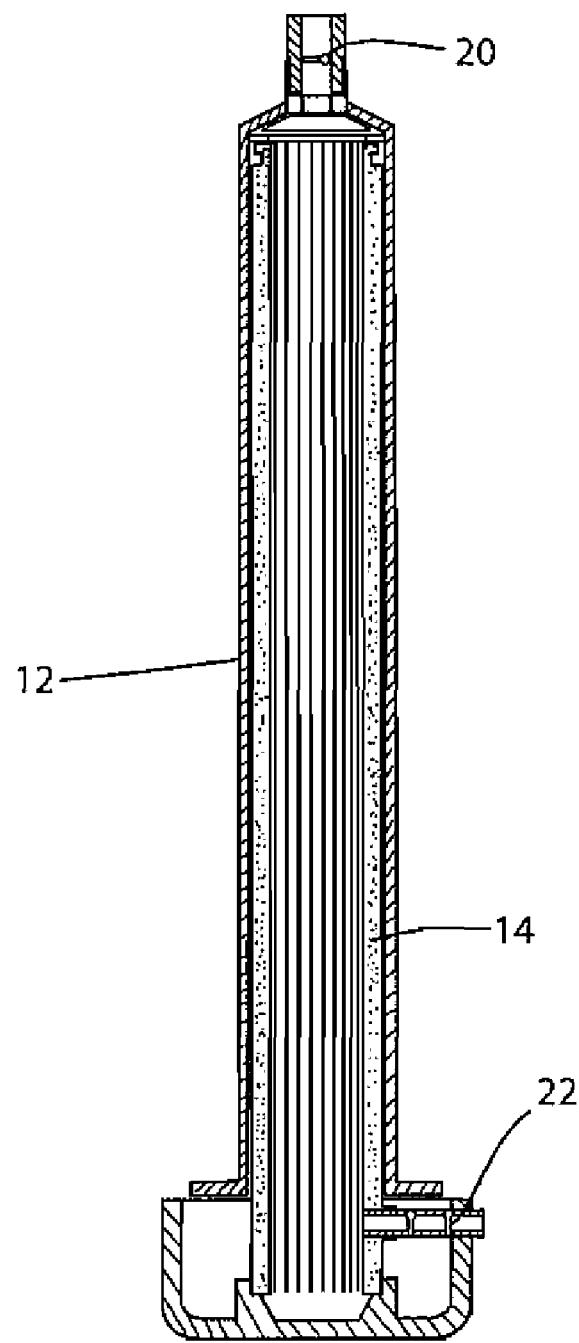
FIG. 5 is a cross-sectional view of the device of FIG. 1 showing the filter/plunger in a fully inserted position.
Figure 6:
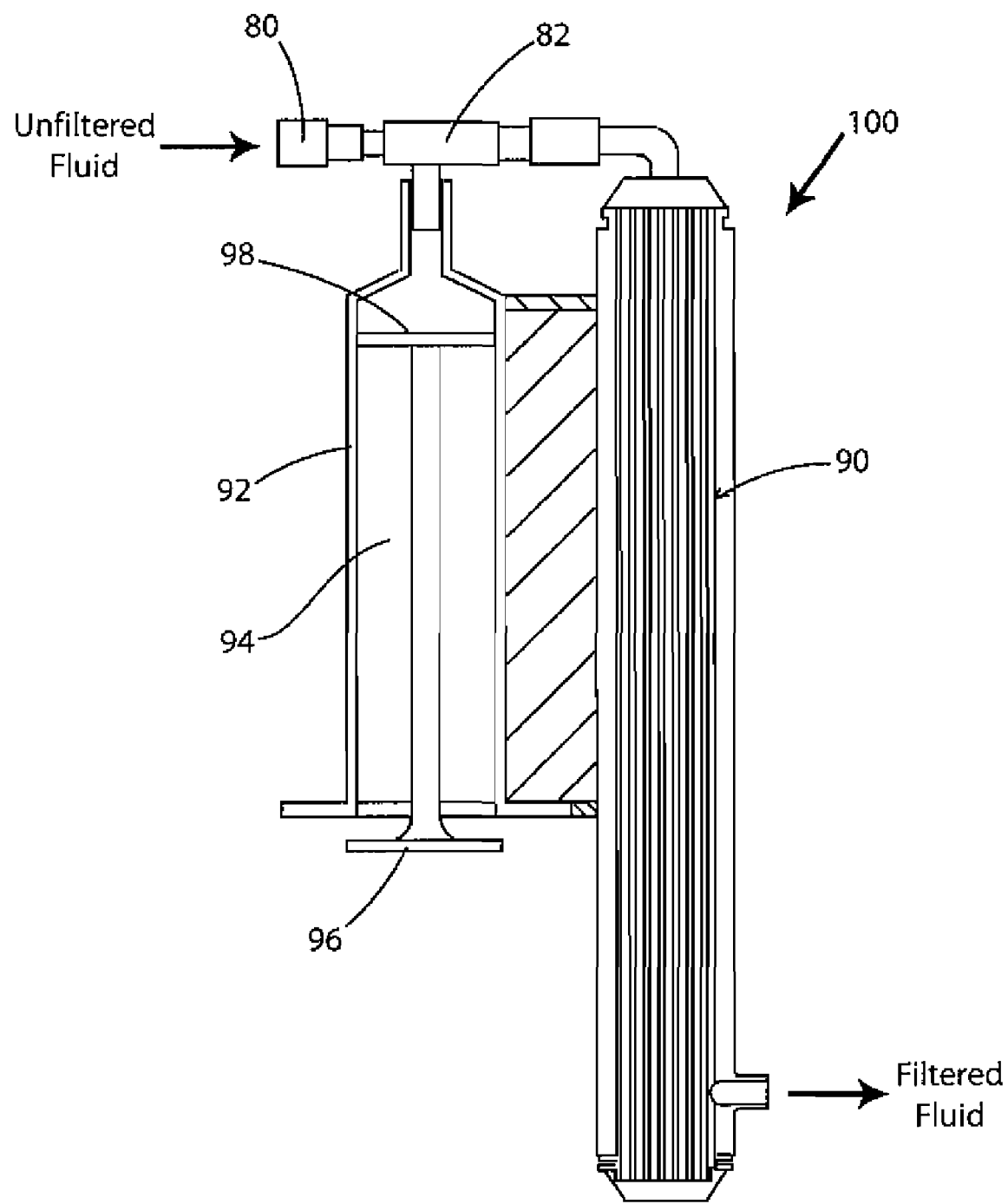
FIG. 6 is a cross-sectional view of a conventional filtering device in which the filter and pump mechanism device are separate components.

It should also be understood to those skilled in the art that the design of the filter/pump device achieves the objective of having a very compact size. This is best illustrated in FIGS. 5 and 6 showing cross-sectional views filter/pump devices. FIG. 5 shows the first embodiment of the invention with the filter/plunger fully inserted inside the barrel 12. This configuration, for example, would be used when carrying, transporting, and storing the device and as such represents its smallest size. As illustrated, the filter element of this device is an integral part of the plunger component 14. FIG. 6 illustrates current state of the art devices whereby a filter component 90 is coupled alongside a pump mechanism 92 to create a single filter/pump unit 100. The pump mechanism shown is a similar piston type volume displacement pump with inlet and outlet one way check valves 80 and 82 respectively that allow for fluid to fill the barrel of piston when the plunger 96 is pulled out and to direct fluid toward the filter 90 when pushing the plunger into the piston barrel. It should be observed however, that in these designs, the filter and the pump mechanism are generally two discrete components of the device. The problem with these designs can be seen by examining the space that the device occupies in its smallest most compact configuration which is when the plunger is fully inserted into the barrel. In this case, there is an obvious dead-space 94 that resides within the piston barrel but behind the plunger seal 98. This dead-space or volume must be considered when carrying, transporting, and storing the device. It should be apparent to those skilled in the art that there is no dead-space with the embodiment shown in FIG. 5 since this space is occupied by the filter component.

It should be understood to those skilled in the art that the filter component of the preferred embodiment can be constructed of any suitable type filter material as known in the art which can include but not limited to hollow fiber membranes, flat or pleated sheet membranes, glass fiber or ceramic filter media, and/or carbon filter blocks. It should also be understood to those skilled in the art that the plunger housing 42 can include multiple filtration stages in series for safety reasons, should one filter stage fail during use. Examples of these multistage filter designs include but are not limited to those filed in U.S. patent applications Nos. 60/714,058, and 60/734,006, each of which is hereby incorporated by reference in its entirety.

Figure 7:
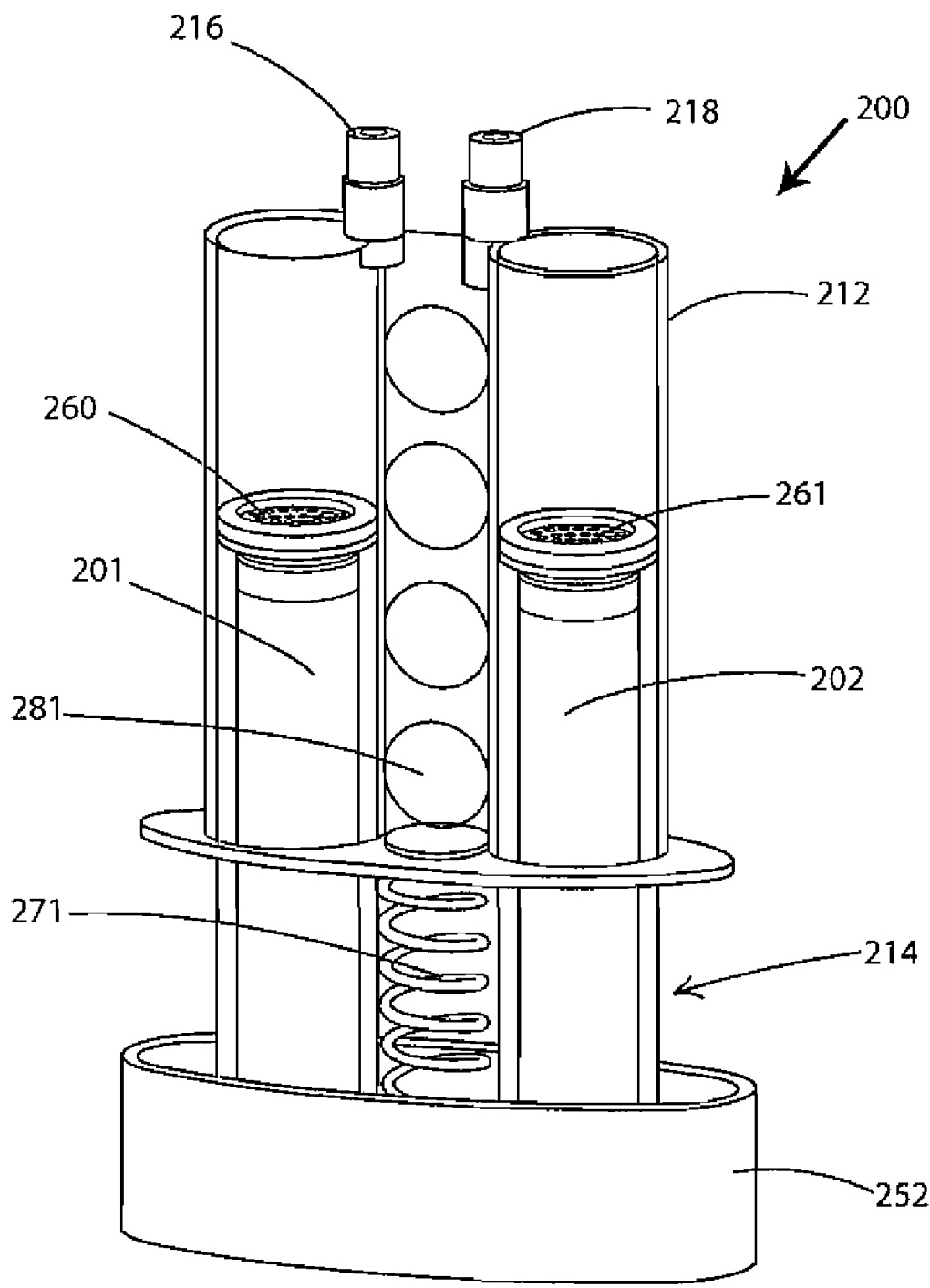
FIG. 7 is a perspective view of a double barrel compact filter/pump device with redundant filter stages according to another embodiment.

A second embodiment of the invention is shown in FIG. 7 as a double barrel filter pump device 200 consisting of a double barrel casing 212 and a double barrel plunger assembly 214 having redundant filter stages 201 and 202, respectively. The redundant filter/plunger stages fit within a double barrel casing 212. An inlet port 216 allows unfiltered fluid to feed into a first side of the double barrel casing 212 while an outlet port 218 allows filtered fluid to exit a second side of the double barrel casing 212. Similar to the first embodiment, a tubesheets 260 and 261 can be formed at the end of each plunger/filter stage to allow fluid to enter and leave the filtration elements positioned inside the plunger housing.

Figure 8:
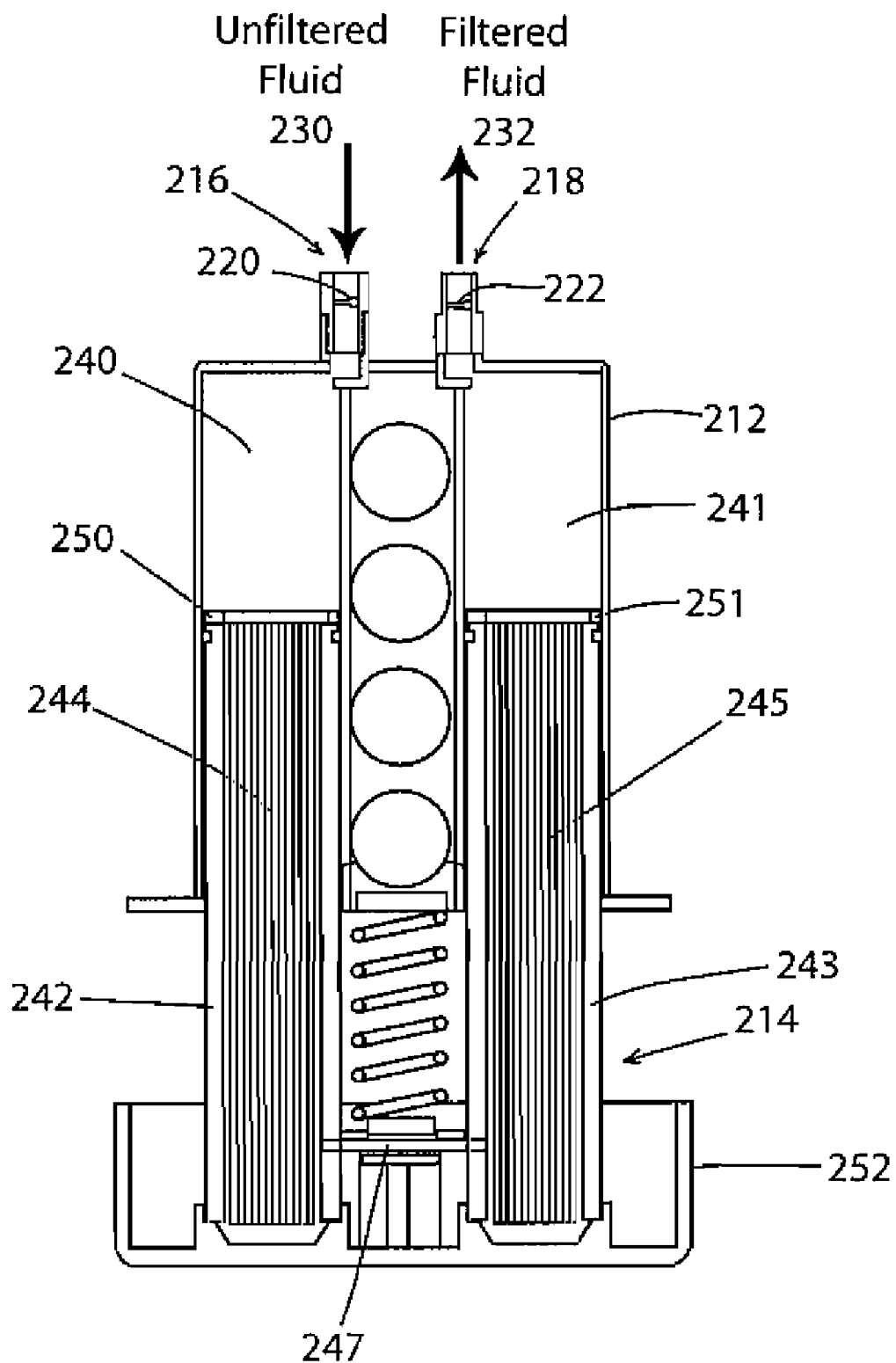
FIG. 8 is a cross-sectional view of the device of FIG. 7 with the plunger in a partially withdrawn state.

Reference is now made to FIG. 8 showing a cross-sectional view of the double barrel filter/pump device. The double plunger assembly 214 may be constructed by connecting two plunger housings 242 and 243 together with a connecting conduit 247. The connecting conduit 247 fluidly connects the once filtered fluid exiting plunger housing 242 to the second plunger housing 243. Similar to the first embodiment, each plunger housing 242 and 243 contains filter elements 244 and 245 respectively, which may be hollow fiber membranes as shown or may be another filter media type which may include flat or pleated sheet membrane, glass fiber or ceramic filter media, and/or carbon filter blocks. Also similar to the first embodiment, plunger seals 250 and 251 may be attached to each plunger housing end to create a leak-tight seal between the plunger housings and the double barrel casing 212. In addition, one-way check valves 220 and 222 may be located near the inlet and outlet ports 216 and 218 respectively. A plunger cap 252 may be attached to said second end of plunger housings 242 and 243 as an aid to better grip and operate the double barrel filter/pump device.

It should be understood to those skilled in the art that operation of the double barrel filter/pump device is composed as two discrete pump phases as follows:

Fluid Suction Phase: The action of pulling the plunger assembly 214 out of the double barrel casing 212 creates a negative pressure inside the barrel compartments 240 and 241 that draws unfiltered fluid 230 into the inlet 216 of the device, through the inlet check-valve 220 and into the expanding barrel compartment 240. Likewise, an even more negative pressure is created in the expanding barrel compartment 241 relative to barrel compartment 240 since fluid can only enter into this compartment by filtration through filter element 245. The outlet check valve 222 further prevents fluid leaking back into the filter/pump device during this phase of the pump operation. As such, the fluid suction phase is characterized as both a filling of unfiltered fluid 230 into barrel compartment 240 and a simultaneous filtering process whereby twice filtered fluid passing through the plunger/filter assembly 214 collects in the expanding barrel compartment 241.

Fluid Expelling Phase: The action of pushing the plunger assembly 214 into the double barrel casing 212 creates a positive pressure in the contracting barrel compartment 240 that forces unfiltered fluid within compartment 240 across the filter elements 244 and 245 thereby removing fluid impurities such as bacteria, other microorganisms, and the like. Because of its proximity to the fluid outlet port 218, a less positive pressure is created inside the contracting barrel compartment 241 relative to barrel compartment 240. As a result, fluid in barrel compartment 240 is forced into plunger/filter assembly 214 which in turn displaces the filtered fluid in barrel compartment 241 and pushes the twice-filtered fluid out through the outlet check-valve 222 and out through the device outlet 218. The inlet check valve 220 further prevents unfiltered fluid 230 from leaking back out of the inlet 216 of the device during this phase of the pump operation. As such, the fluid expelling phase is characterized as both a filtering process whereby unfiltered fluid 230 inside barrel compartment 240 passes through the plunger/filter assembly 214 and simultaneously displaces and expels the twice-filtered fluid out of the contracting barrel compartment 241.

Figure 9:
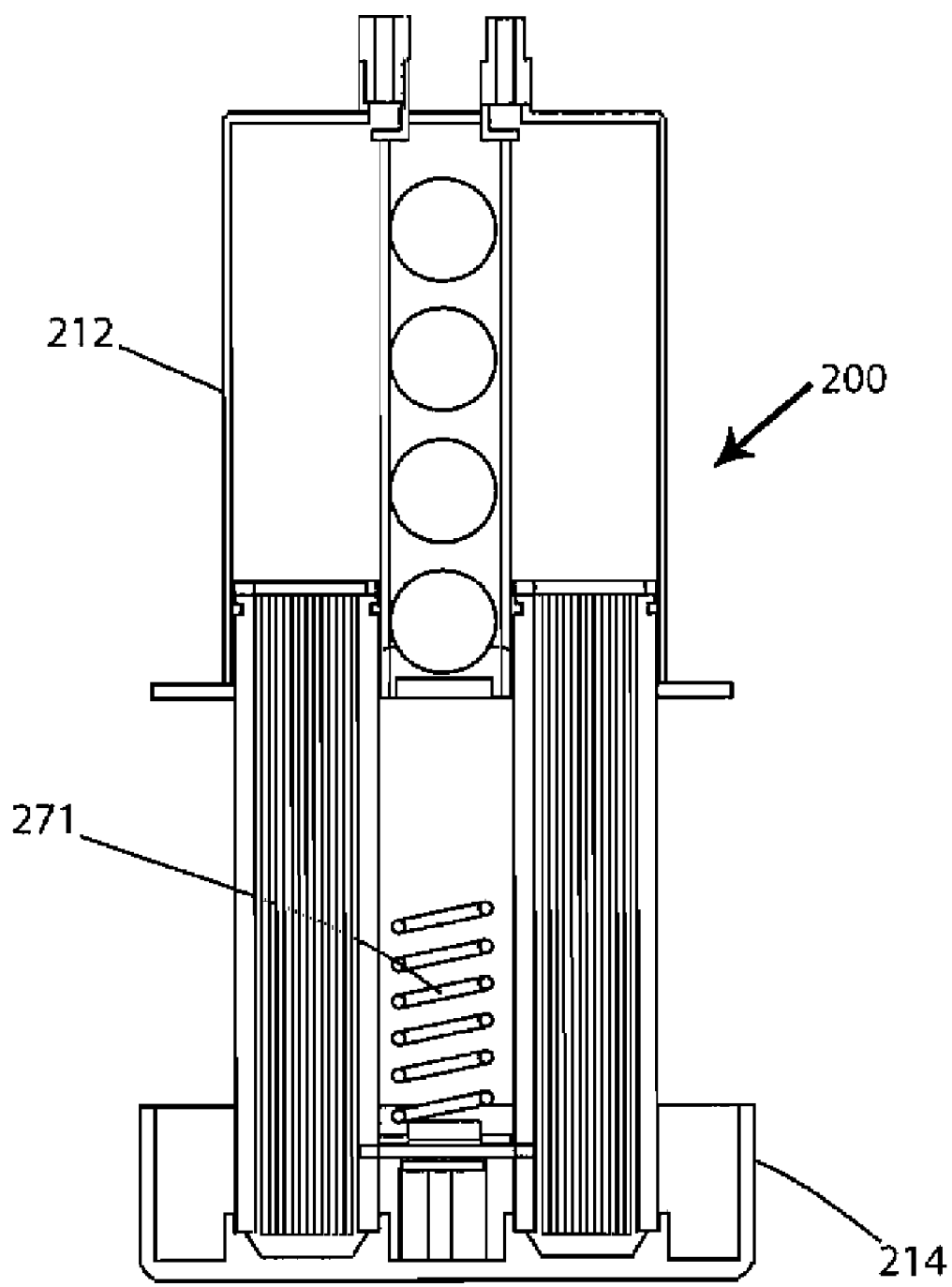
FIG. 9 is a cross-sectional view of the device of FIG. 7 with the plunger at a fully extended position.

An optional feature of this device may be the inclusion of a spring 271 that is positioned between the barrel casing 212 and the filter plunger assembly 214. This could enable a one-handed operation of the filter/pump device whereby an individual could position their finger and thumb through the finger hole 281 and around the plunger cap 252, respectively. The expelling phase of the filter/pump operation could then be accomplished by squeezing (or clenching) the finger and thumb together which compresses the spring 271 while the suction phase could be accomplished by relaxing the hand and allowing the spring 271 to recoil to its normal length. As shown in FIG. 9, one may securely attach only one end of the spring 271, such as to the filter/filter assembly 214. This would allow a two-handed operation of the device whereby one could achieve a faster pumping rate using a longer pump stroke length.

Figure 10:
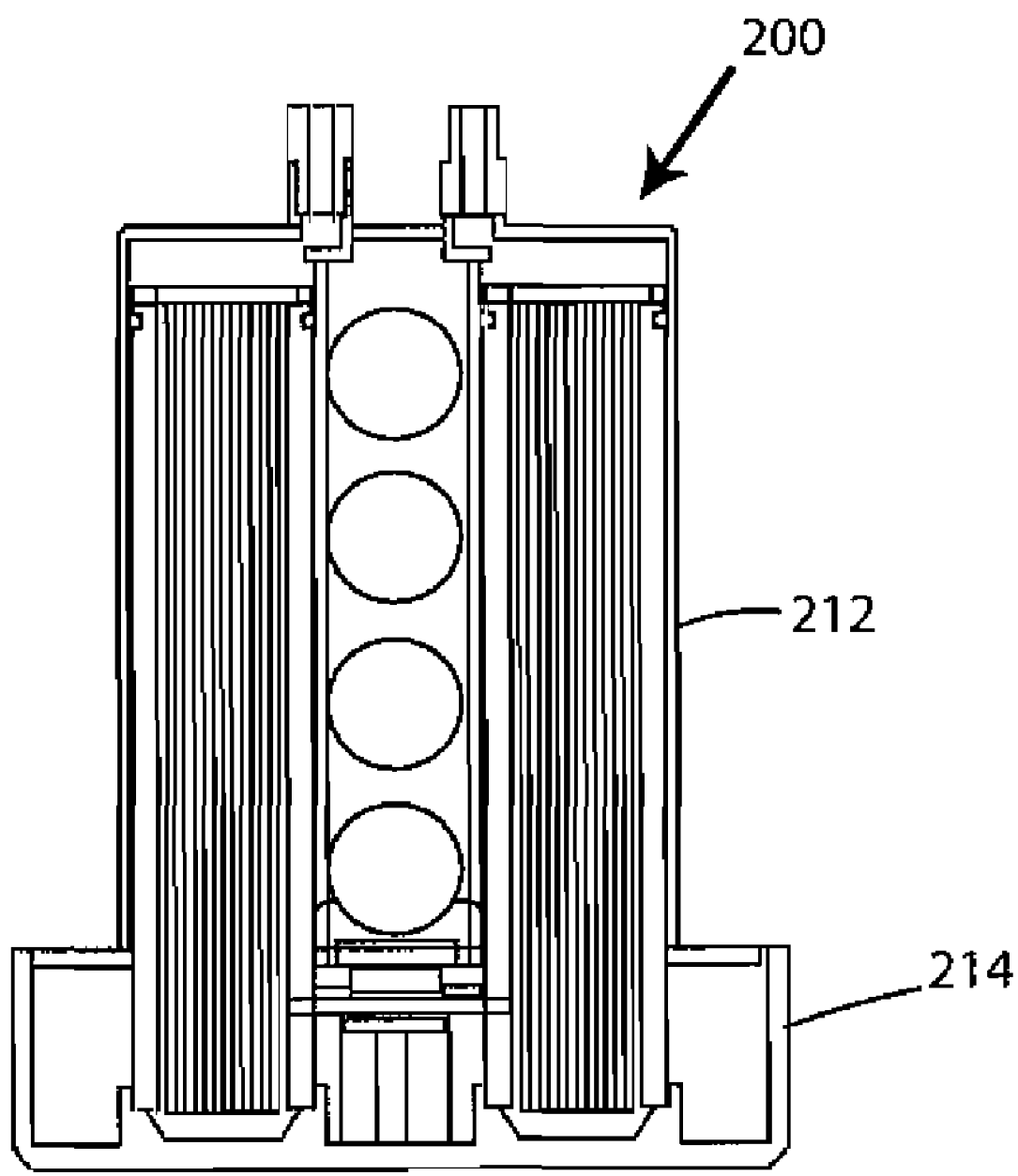
FIG. 10 is a cross-sectional view of the device of FIG. 7 with the plunger in a close position with the plunger fully inserted inside the barrel.

Reference is now made to FIG. 10 where the double barrel filter/pump device 200 is shown with the filter/plunger assembly 214 fully inserted inside the barrel 214. This configuration, for example, would be used when carrying, transporting, and storing the device and as such represents its smallest size. As in the first embodiment, the filter elements of this filter/pump device are both an integral part of the plunger assembly 214. Therefore, it should be apparent to those skilled in the art that there is no dead-space associated with the pump mechanism with this second embodiment as the barrel space is again occupied by the filter component of the device.

Figure 11A:
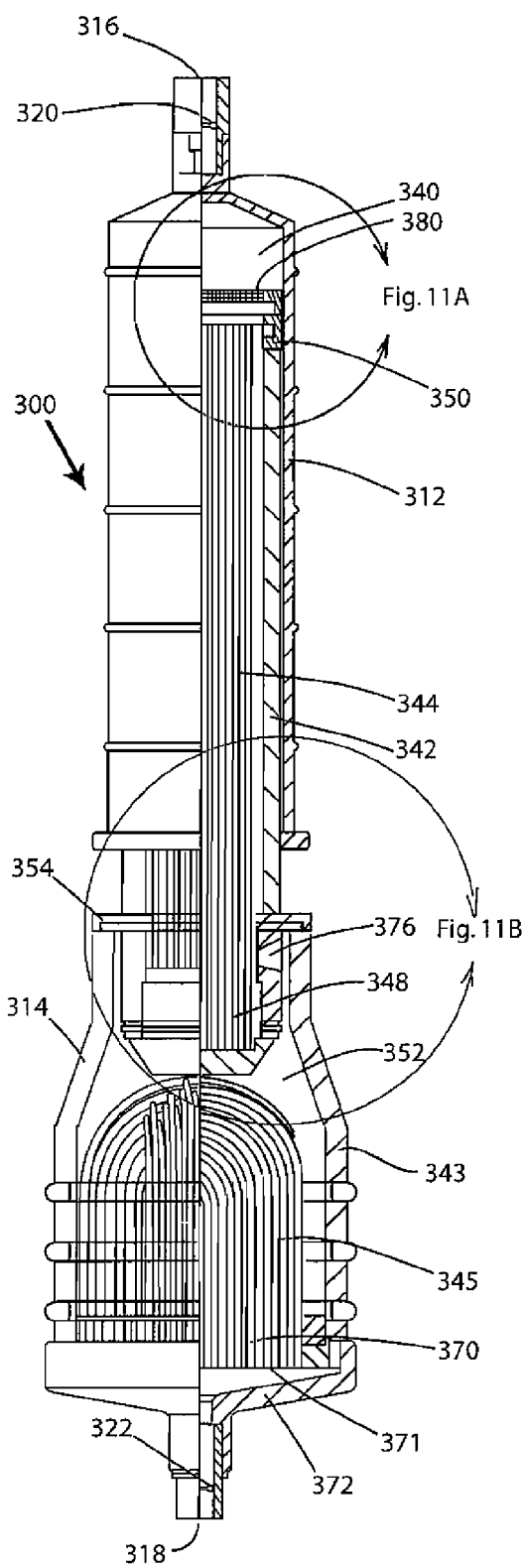
FIG. 11A is a cross-sectional view of a compact filter/pump device with redundant filter stages according to another embodiment.
Figure 11B:
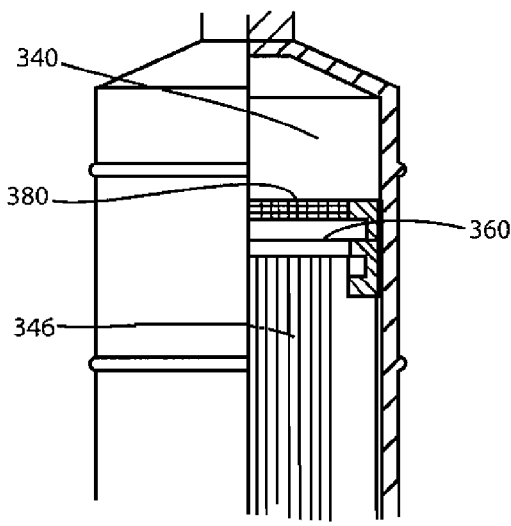
FIG. 11B is an enlarged cross-sectional view of a pre-filter screen of the device of FIG. 11A.
Figure 11C:
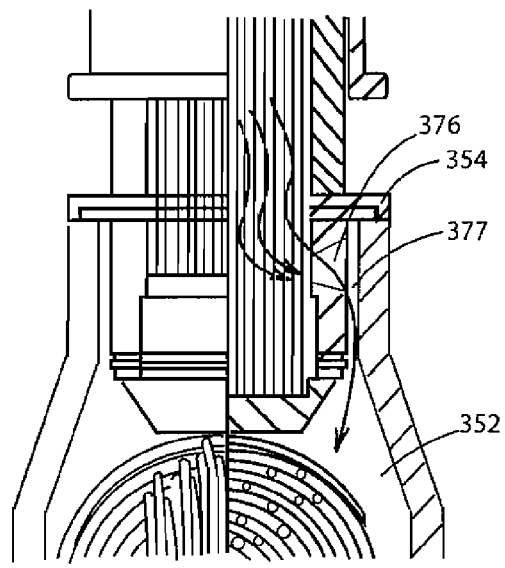
FIG. 11C is an enlarged cross-sectional view of a coupling between first and second plunger housings of the device of FIG. 11A.

Reference is now made to FIGS. 11A-C showing an alternate design of a two-stage filter/pump device 300 that consists of a single barrel 312 and a plunger assembly 314 that consists of two filtration stages. The right side of the device shows a sectional view to better visualize the internal construction of the device. In the same manner as the first embodiment, an inlet port 316 receives the fluid to be filtered and passes through an inlet one-way check valve 320. The incoming fluid fills the expanding internal barrel compartment 340 as the plunger assembly 314 is being withdrawn. A one-way check valve 322 near the outlet port 318 of the plunger assembly 314 keep fluid from entering the filter pump device at this end as indicated in previous embodiments.

Construction of the first filter stage of the plunger assembly is similar to previous embodiments in that a filter housing 342 encloses a filter element 344, such as hollow fibers as shown here. A first end of the plunger casing is potted with a potting compound 346 and is trimmed to form a tubesheet 360. A plunger seal 350 is also attached at this end of the casing to form seal between the barrel 312 and the plunger housing 342. An added feature may be the inclusion of a pre-filter screen 380 that keeps large particulate from reaching the tubesheet 360. The may be beneficial since a large particle could block flow into one or more of the hollow fibers which could drastically reduce its efficiency. At the second end of the first filter stage, the filter elements 344 are sealed in potting compound 348. An opening 376 in the filter housing 342 allows filtered fluid to exit the first filter housing.

Attached to the second end of the plunger housing 342 is a second filter housing 343 that encloses a second filter element 345, such as hollow fibers as shown here. At a first end of the said second filter housing 343, the housing 343 is joined to the plunger housing 342 to form a leak-tight joint 354. This joint may be formed by ultrasonically welding the two parts together or may be cemented or solvent bonded together as is known in the art. The second end of said second filter housing is potted with a potting compound 370 and trimmed to form a tubesheet 371. As shown, the filter elements may be hollow fibers and may be formed in a "U" shaped configuration. In this configuration, fluid being filter must traverse the membrane from the outside to the inside, whereby filtered fluid exits the lumens of the fibers at the tubesheet 371. An external header cap 372 is also attached to said second end to direct the filtered fluid to the outlet one-way check valve 322 and outlet port 318. The second filter housing 343 may preferentially be made with an optically clear material to aid in viewing the upstream side of the filter membrane. As described in U.S. patent application 60/809,648, which is hereby incorporated by reference in its entirety, there is an advantage of this design in that one can indirectly verify the integrity of the first filter stage by inspection of the upstream side of the filter membrane. If the first filter stage has failed, a build up of sediment on the second filter may be noticeable as a change in appearance whereby it looks "dirty" in color.

The operation of the filter/pump device 300 is as follows.

Fluid Suction Phase: The action of pulling the plunger 314 out of the barrel 312 creates a negative pressure inside the barrel compartment 340 that draws unfiltered fluid into the inlet 316 of the device, through the inlet check-valve 320 and into the expanding barrel compartment 340. The outlet check valve 322 further prevents fluid leaking back into the filter/pump device during this phase of the pump operation.

Fluid Expelling Phase: The action of pushing the plunger 314 into the barrel 312 creates a positive pressure in the contracting barrel compartment 340 that forces unfiltered fluid within compartment 340 across the filter elements 344 thereby removing fluid impurities such as bacteria, other microorganisms, and the like. The once filtered fluid (or permeate) 377 collects downstream of the first filter element 344 and passes through an opening 376 of a first filter housing 342 and into an interstage compartment 352. The once-filtered fluid 377 is then filtered a second time as it is forced across a second set of filter elements 345 whereby it is directed toward an outlet check-valve 322 and out through the device outlet 318. The inlet check valve 320 further prevents unfiltered fluid from leaking back out of the inlet 316 of the device during this phase of the pump operation.

Figure 12:
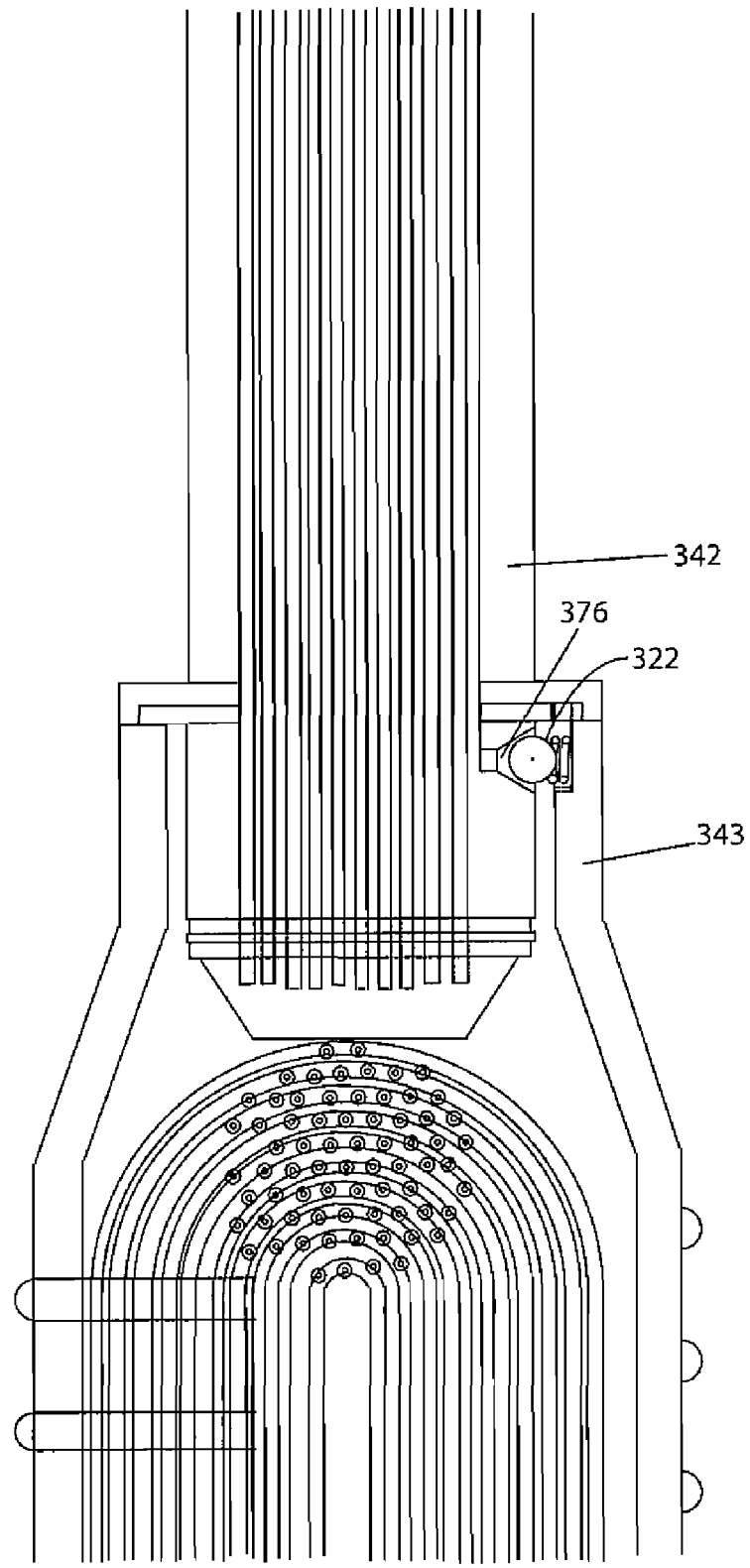
FIG. 12 is a partial cross-sectional view of the coupling between first and second plunger housings of the device of FIG. 11A with a one-way valve therebetween.

Reference is now made to FIG. 12 which shows an alternative placement of the outlet one-way check valve 322 which is at the opening 376 between the two filter stages. It should be appreciated by those skilled in the art that placement in this position does not alter the function of the device, but reduces the complexity and number of components by taking advantage of the geometry of the opening and the relative configuration of the two filter housings 342 and 343 respectively.

Figure 13:
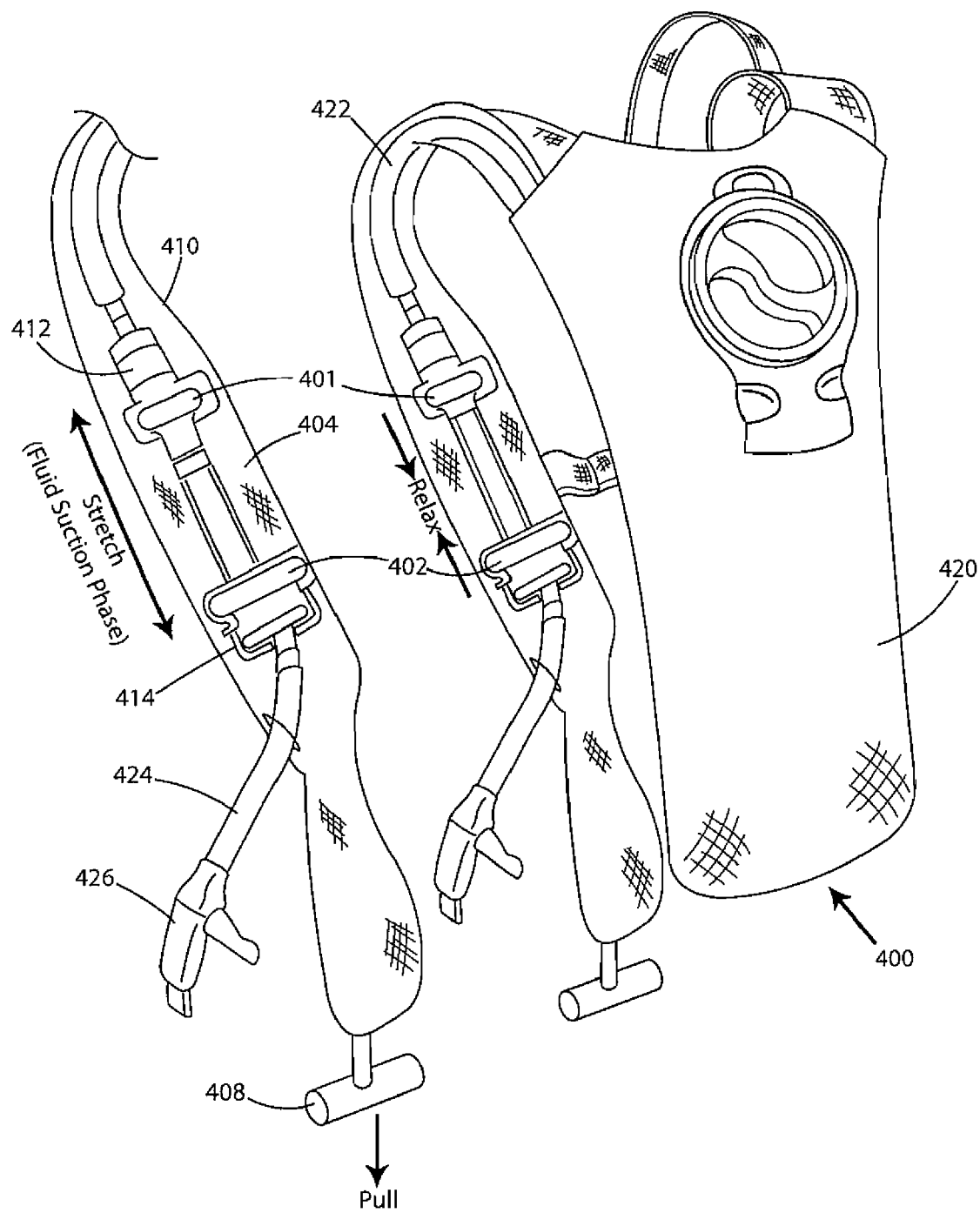
FIG. 13 is a schematic showing a filter/pump device as part of a hydration backpack system.

Reference is now made to FIG. 13 which shows a filter/pump device as part of a hydration backpack system 400 and in particular, the filter/pump device can be any of the previously discussed embodiments, including the device 300 of FIGS. 11A-C as shown in FIG. 13. As shown, the filter/pump device is physically attached to one of the shoulder straps 410 of the backpack. The shoulder strap has been modified to include an elastic element 404, at least two securing straps 401 and 402, and a pull handle 408. The elastic element 404 can be an elastic band material as is known in the art. The inlet end of the filter/pump device is fluidly connected to a fluid reservoir 420 via a connecting tube 422, while the outlet end of the filter/pump device may be attached to an outlet tube 424 and a mouthpiece fitting 426. In the configuration shown, the barrel portion 412 of the filter/pump device is secured to the shoulder strap with securing strap 401 in a position above the elastic element 404 and the plunger portion 414 is secured to the shoulder strap with securing strap 402 in a position below the elastic element. It should be understood that the filter/pump device can include additional attachment points with additional slots and/or tabs constructed as part of the barrel and plunger components provided these do not interfere with the operation of the device.

Operation of the device may be performed with one-hand whereby the wearer of the backpack grasps and pulls down on the pull handle 408 which is attached to the shoulder strap at a position below the elastic element 404. Because the top of the shoulder strap is supported by the wearer's shoulder, the action of pulling down on the pull handle results in a lengthening or stretching of the elastic element 404 of the shoulder strap while at the same time withdrawing the plunger component 414 out of the barrel 412 of the filter/pump device. This action thus accomplishes the "fluid suction" phase of the pump operation as described previously as well as serves to store a potential energy in the elastic element of the shoulder strap. Upon letting go of the pull handle 408, the energy stored in the elastic element 404 serves to push the plunger 414 back into barrel 412 as it recoils back from its stretched position. This, therefore, accomplishes the "fluid expelling" phase of the pump operation as described previously.

It also should be understood that the filter/pump device may be a replaceable component of the hydration backpack system and as such may fit into a compartment (not shown) that includes a flap that can be opened for replacement of the filter/pump device.

It will be appreciated by persons skilled in the art that the present invention is not limited to the embodiments described thus far with reference to the accompanying drawings; rather the present invention is limited only by the following claims.

What is claimed is:

1. A compact fluid purification device comprising:
   a housing having an inlet for receiving unfiltered liquid and an open end;
   a first valve disposed within the inlet and being configured to only permit unfiltered liquid to flow into a hollow interior of the housing;
   a plunger received within the open end such that it slides within the interior of the housing, the plunger being movable between a fully extended position and a fully retracted position, wherein the plunger has an elongated housing that includes a filter element that is open at a distal end of the plunger housing and is in communication with an outlet that is associated with the plunger, wherein movement of the plunger toward the fully extended position causes unfiltered liquid to be drawn into the interior of the housing, wherein the filter element comprises a plurality of hollow filter membranes in the form of fibers that are open at first ends at the distal end of the plunger and are in communication with the hollow interior, wherein opposite second ends of the fibers are closed, wherein at least a portion of the fibers extend beyond the housing; and
   a second valve disposed within the outlet and being configured to only permit filtered liquid to be discharged from the plunger housing;
   wherein the unfiltered liquid is filtered when the plunger is moved toward the fully retracted position causing the unfiltered liquid in the interior to flow into the inside of the fibers and then across the fibers to a plunger space surrounding the fibers and into the outlet which is in fluid communication with the plunger space.

2. The device of claim 1, wherein the first valve comprises a one-way check valve disposed within the inlet that leads to the interior of the housing and the second valve comprises a one-way check valve.

3. The device of claim 1, wherein the housing comprises an elongated barrel that has a neck portion which defines the inlet and the opening of the housing is opposite the neck portion.

4. The device of claim 1, wherein the elongated housing of the plunger comprises a cylindrically shaped housing that is open at first and second ends, the first end containing a first potting compound disposed at the open first ends of the fibers and the second end of the elongated housing includes a second potting compound that seals the second ends of the fibers.

5. The device of claim 1, further including: a cap that is attached to a proximal end of the plunger housing, the outlet being defined in the cap and the second valve being disposed in the outlet in the cap.

6. The device of claim 1, further including a plunger seal attached to the distal end of the plunger for sealingly contacting an inner surface of the housing, the plunger seal having a central opening through which the open end of the filter element is accessible to permit flow of unfiltered liquid into the inside of the filter element.

7. The device of claim 1, wherein the outlet is in the form of an outlet conduit that has a first end in fluid communication with the plunger housing and an opposite second end through which the filtered liquid is discharged.

8. The device of claim 1, wherein the liquid is water.

9. A compact fluid purification device comprising:
   a housing having an inlet for receiving unfiltered liquid and an open end;
   a first valve disposed within the inlet and being configured to only permit unfiltered liquid to flow into a hollow interior of the housing;
   a plunger received within the open end such that it slides within the interior of the housing, the plunger being movable between a fully extended position and a fully retracted position, wherein the plunger has an elongated housing that includes a filter element that is open at a distal end of the plunger housing and is in communication with an outlet that is associated with the plunger, wherein movement of the plunger toward the fully extended position causes unfiltered liquid to be drawn into the interior of the housing, wherein the filter element comprises a plurality of hollow filter membranes in the form of fibers that are open at the distal end of the plunger and are in communication with the hollow interior of the housing; and
   a second valve disposed within the outlet and being configured to only permit filtered liquid to be discharged from the plunger housing;
   wherein the unfiltered liquid is filtered when the plunger is moved toward the fully retracted position causing the unfiltered liquid in the interior to flow into the inside of the fibers and then across the fibers to a plunger space surrounding the fibers and into the outlet which is in fluid communication with the plunger space;
   wherein the outlet and second valve are located outside of the housing, the housing being configured to prevent the outlet and second valve from entering the interior space of the housing.

10. The device of claim 9, wherein the first valve comprises a one-way check valve disposed within the inlet that leads to the interior of the housing and the second valve comprises a one-way check valve.

11. The device of claim 9, wherein the housing comprises an elongated barrel that has a neck portion which defines the inlet and the opening of the housing is opposite the neck portion.

12. The device of claim 9, wherein the elongated housing of the plunger comprises a cylindrically shaped housing that is open at first and second ends, the first end containing a first potting compound disposed at the open first ends of the fibers and the second end of the elongated housing includes a second potting compound that seals the second ends of the fibers.

13. The device of claim 9, further including: a cap that is attached to a proximal end of the plunger housing, the outlet being defined in the cap and the second valve being disposed in the outlet in the cap.

14. A compact fluid purification device comprising:
a housing having an inlet for receiving unfiltered liquid and an open end;
a first valve disposed within the inlet and being configured to only permit unfiltered liquid to flow into a hollow interior of the housing;
a plunger received within the open end such that it slides within the interior of the housing, the plunger being movable between a fully extended position and a fully retracted position, wherein the plunger has an elongated housing that includes a filter element that is open at a distal end of the plunger housing and is in communication with an outlet that is associated with the plunger, wherein movement of the plunger toward the fully extended position causes unfiltered liquid to be drawn into the interior of the housing, wherein the filter element comprises a plurality of hollow filter membranes in the form of fibers that are open at the distal end of the plunger and are in communication with the hollow interior; and
a second valve disposed within the outlet and being configured to only permit filtered liquid to be discharged from the plunger housing;
a cap that is attached to a proximal end of the plunger housing, the cap having dimensions greater than the housing to prevent reception of the cap within the interior of the housing, wherein the outlet and second valve are formed in the cap at a location remote from the hollow interior of the housing;
wherein the unfiltered liquid is filtered when the plunger is moved toward the fully retracted position causing the unfiltered liquid in the interior to flow into the inside of the fibers and then across the fibers to a plunger space surrounding the fibers and into the outlet which is in fluid communication with the plunger space.

15. The device of claim 14, wherein the outlet is in fluid communication with a plunger space that is defined around the fibers, the plunger space receiving filtered liquid.

16. The device of claim 14, wherein the unfiltered liquid flows into the inlet along a first axis and filtered liquid flows through the outlet along a second axis, the first and second axes intersecting one another.

17. The device of claim 16, wherein the first and second axes are perpendicular to one another.

18. The device of claim 14, wherein the cap has a flange side wall that surrounds the elongated housing of the plunger, the outlet extending between the elongated housing of the plunger and the side wall.

19. The device of claim 14, wherein the fibers are sealed at a proximal end of the plunger so as to force the liquid to be filtered across the fibers in order to flow into the outlet.

* * * * *